United States Patent [19]

Palombo et al.

[11] Patent Number: 4,675,349

[45] Date of Patent: Jun. 23, 1987

[54] METHOD OF PREPARING COMPOSITION FOR TIRE TREAD CAP

[75] Inventors: James L. Palombo, North Canton; Richard L. Miller, Akron, both of Ohio

[73] Assignee: GenCorp Inc., Akron, Ohio

[21] Appl. No.: 902,856

[22] Filed: Sep. 2, 1986

[51] Int. Cl.[4] .......................... C08K 5/01; C08L 7/00; C08L 9/00; C08L 9/06
[52] U.S. Cl. .............................. 523/351; 152/209 R; 524/525; 525/232
[58] Field of Search ....................... 525/232; 523/351; 524/525; 152/209 R

[56] References Cited

U.S. PATENT DOCUMENTS 4,005,054  1/1977  Bonnefon et al. ................. 264/147
4,321,168  2/1982  Ueda et al. ......................... 523/351

OTHER PUBLICATIONS

*Rubber Age,* Jan. 1958, pp. 664–671.
*Rubber & Plastics News,* Sep. 27, 1982, pp. 44–46.

*Primary Examiner*—Allan M. Lieberman

[57] ABSTRACT

A pneumatic tire is disclosed which exhibits a good balance of rolling resistance, skid resistance, wear and handling. The rubber compound of the tread cap of the tire contains minor amounts by weight of finely divided high molecular weight high density polyethylene optionally with additional process oil.

4 Claims, 1 Drawing Figure

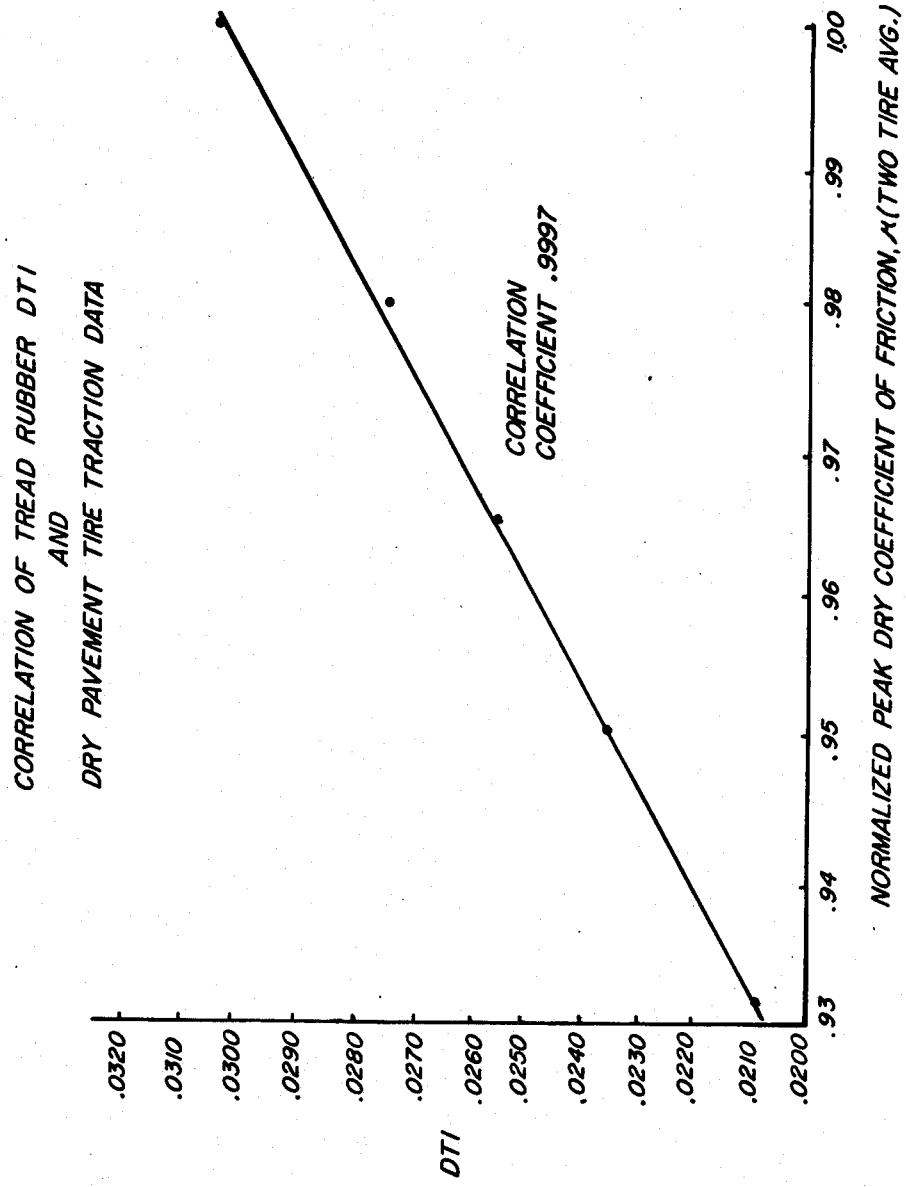

METHOD OF PREPARING COMPOSITION FOR TIRE TREAD CAP

This invention relates to pneumatic tire tread caps.

The tread cap is considered a major contributor to rolling resistance. Therefore the property of low hysteresis or low energy loss of the tread cap compound is considered as one of the most important single factors in improving a tire's fuel economy.

Although it is relatively easy to improve the hysteresis of a compound, it becomes rather difficult to improve this property without a loss in traction properties. This is increasingly difficult when the abrasion resistance must be sustained along with hardness (related to cornering) and with maintenance of hot tear resistance (related to mold stripping). Therefore, a compounding concept which improves or maintains a balance of properties while improving hysteresis is very rare and highly sought after for making an improved tread cap for a pneumatic tire.

An object of this invention is to avoid the difficulties alluded to above and to provide a pneumatic tire having an improved tread cap.

Another object of this invention is to provide a process for making an improved tread cap for a pneumatic tire.

These and other objects and advantages of the present invention will become more apparent to those skilled in the art from the following detailed description, examples and accompanying drawing which is a graph correlating tread rubber DTI and dry pavement tire traction data.

SUMMARY OF THE INVENTION

According to the present invention the use of a minor amount of finely divided, high density, high molecular weight polyethylene, together preferably with additional process oil, in a rubber tread cap compound for a pneumatic tire provides a cap exhibiting good tangent $\delta$ value (relatively lower hysteresis, indicating lower rolling resistance) and a good wet $\mu$ (relatively higher wet coefficient of friction) while also maintaining necessary stiffness, abrasion and tear properties for good tire handling, wear and tire-demolding properties, respectively. Thus, the use of small particles of HMW polyethylene in tread compounds as part of the reinforcement in conjunction with a usual type and quantity of carbon black, and an incremental increase in process oil, provides an improved balance of tire rolling resistance, traction, wear, handling and hot mold-release tear resistance. Also, vulcanizable compounds of the present invention when extruded do not give rough extrudates with torn edges if the HMW polyethylene is mixed in the final pass of a normal two-pass mix in an internal mixer, along with the curatives, etc., at mixer temperatures below the softening temperature of the polyethylene. The HMW polyethylene is such that in the described tire compound mixing operations, the particulate nature of the polyethylene does not change, even after high temperature curing, reaching about 360° F.

DISCUSSION OF DETAILS AND PREFERRED EMBODIMENTS

The polyethylene used in the tread cap compound of the present invention is a crystalline and linear polyethylene having a weight average molecular weight of from about one to six million, preferably about 1.5 million. It has a density (g/cc) of from about 0.93 to 0.95, a softening point above about 275° F. and a particle size where about 70% of the particles pass a U.S. Standard Scale No. 100 sieve and 99% pass a Scale No. 80 sieve. The polyethylene is used in an amount of from about 2 to 20, preferably in an amount of from about 5 to 15, PHR (parts by weight per 100 parts by weight of rubber).

The process oil added to the internal mixer, e.g., paraffinic, naphthenic, aromatic or blends thereof, is used in an amount of from about 4 to 65, preferably from about 6 to 40 PHR. The quantity of oil is determined in part by the oil viscosity and the specific compound processing needs and, if desired, an additional quantity of said process oil can be used to compensate for the increased stiffness caused by addition of the HMW polyethylene.

The rubber tread compound contains the usual rubbers used in tire treads such as one or more rubbers like natural rubber; polyisoprene; emulsion or solution SBR which may be low, medium or high vinyl; cis polybutadiene, vinyl polybutadiene and so forth. The SBR or polybutadiene polymers may be oil-extended. Other compounding ingredients include retarders, wax, antioxidants, activators such as zinc oxide and stearic acid, reinforcing carbon black, sulfur and accelerators.

The tread cap compounds of this invention can be used as tread caps in the manufacture of bias, bias belted and radial passenger, light truck, truck, bus, off-the-road, trailer, farm and airplane tires.

The following examples will serve to illustrate the present invention with more particularity to those skilled in the art.

EXAMPLE I

In preparing a tread cap compound designated as "A", natural rubber, 93% cis-polybutadiene, medium vinyl polybutadiene, carbon black, wax, amine antioxidant, activator (stearic acid and zinc oxide) and the process oil were mixed in a Banbury to about 320° F. (range: about 290° to 350° F.). This first pass mix, or masterbatch, was discharged onto a two roll mill for sheeting off to facilitate cooling and handling as is normal practice. The cooled masterbatch stock was reloaded into the internal mixer (Banbury), curatives (such as sulfenamide accelerator and insoluble sulfur) were added and were mixed to a discharge temperature of about 220° F., although the temperature can be as high as about 240° F., or as low as 200° F. Tread cap compounds were prepared and designated as:

"A+5 PHR 1.5 MMW PE"
"A+10 PHR 1.5 MMW PE"
"A+10 PHR 1.5 MMW PE+6 PHR Naphthenic Oil"
"A+10 PHR 1.5 MMW PE+12 PHR Naphthenic Oil"
(MMW=Million Molecular Weight)
were each mixed in like manner as described above, except that the 1.5 MMW PE was always added in the second pass mix, along with the curatives. The extra 6 or 12 parts naphthenic process oil, if used, was added approximately mid-way in the first pass mix after black incorporation, as is normal good practice.

Samples were cut from the finished stock, placed in molds and cured at 320° F. The fully cured and cooled samples were then tested. The results obtained are shown in Table I, below:

TABLE I

| Compound Variations (Quantities in PHR) | Yerzley Tan δ | MTS Tan δ at 12 Hertz | Durometer Shore A | Dynamic Mod. MTS at 12 Hertz |
| --- | --- | --- | --- | --- |
| Cap Compound A, Control | .256 | .205 | 63 | 2130 |
| Cap Compound A + 5 PHR 1.5 MMW PE | .265 | .200 | 66 | 2480 |
| Cap Compound A + 10 PHR 1.5 MMW PE | .255 | .199 | 70 | 2780 |
| Cap Compound A + 10 PHR 1.5 MMW PE + 6 PHR Naphthenic Oil | .246 | .191 | 66 | 2190 |
| Cap Compound A + 10 PHR 1.5 MMW PE + 12 PHR Naphthenic Oil | .242 | .194 | 64 | 2050 |

| Material | Hot Mold Tear 350° F. | Pico Index | Lab Dry Traction Indicator | IPST μ wet |
| --- | --- | --- | --- | --- |
| Cap Compound A, Control | .39" | 133 | .037 | .45 |
| Cap Compound A + 5 PHR 1.5 MMW PE | .41" | 156 | .037 | .47 |
| Cap Compound A + 10 PHR 1.5 MMW PE | .44" | 182 | .034 | .46 |
| Cap Compound A + 10 PHR 1.5 MMW PE + 6 PHR Naphthenic Oil | .44" | 157 | .040 | .46 |
| Cap Compound A + 10 PHR 1.5 MMW PE + 12 PHR Naphthenic Oil | .19" | 159 | .045 | .46 |

There were not any particles of polyethylene visible to the naked eye in the abraded surfaces of the laboratory traction tests or Pico Abrasion Test.

Of the above runs, the last one employing 10 PHR polyethylene and 12 PHR oil, represents the best of these for achieving a superior balance of tread properties wherein it is desired to improve rolling resistance and traction relative to the "A" control compound, while also maintaining the other properties of wear, handling and hot mold-release tear resistance at least equal to the control.

Alternatively, cap compound A+10 PHR 1.5 MMW PE represents the best choice of the above runs wherein it is desired to significantly increase stiffness for increased tire handling response and improved wear resistance with no adverse effect on rolling resistance and wet traction and only minor adverse effects on dry traction and hot mold tear resistance.

NOTES FOR TABLE I:

Loss Tangent or Tangent Delta (Tan δ): Energy loss term, measured via an Instrumented Yerzley Oscillograph at room temperature and approximately 5 Hertz, or on an MTS Dynamic Spectrometer Model 830 at room temperature and 12 Hertz. It relates directly to rolling resistance. The lower the tan δ, the lower the rolling resistance.

Shore "A" Durometer (Indentation Hardness): Run as described in ASTM D2240. Higher number means higher hardness. Tread hardness is one of several parameters which are utilized to effect required tire handling properties. Higher tread hardness imparts somewhat higher cornering coefficient.

Dynamic Modulus: Measured via an MTS Model 830 Dynamic Spectrometer operated at room temperature and 12 Hertz. An indication of relative reinforcement in a dynamic mode. Greater modulus is indicative of greater reinforcement.

Hot Mold Tear Resistance: Measured by extraction of 350° F. cured sample from a mold simulating tread patterns typical of current radial passenger car tire treads. Total length of tearing relates directly to factory tearing experience. Lower numbers are desirable.

Pico Abrasion Index: Run as described in ASTM D2228. Higher number means better wear resistance in this test and is indicative of longer wear potential on the road. This test is generally more severe than observed in normal wear of radial ply tires.

Wet Skid Coefficient of Friction (μ Wet): Measured with an instrumented British Portable Skid Tester (IPST) using a wetted smooth concrete surface to simulate a wet roadway. Wet-skid values are relative to a standard μ-wet value of 0.600 for a 65/35 ESBR/BR control tread formulation. It relates directly to wet tire traction data. The higher the μ-wet, the better the traction performance on a wet road.

ESBR: Emulsion polymerized copolymer of butadiene-1,3 and styrene, about 23.5% styrene.

BR: Polybutadiene, about 93% cis.

Dry Traction Indicator (DTI) For Tread Compound of Low Rolling Resistance Tires

DTI is the slope of a linear plot of tangent δ as ordinate vs. log-frequency-squared for each compound, where tangent δ is measured by an MTS Model 830 dynamic spectrometer over a range of frequency from about 1 to 30 Hertz at room temperature (73° F.). The greater the DTI the greater the peak dry traction of a given tread compound on radial passenger car tires, as measured by an instrumented traction-trailer.

That tire dry traction is predicted by the above indicator is evidenced from the idealized tread rubber plots presented by Nordsiek ("Model Studies for the Development of an Ideal Tread Rubber", A.C.S. Rubber Division paper presented at the Spring 1984 meeting), as well as by others; i.e., the desired changes in tan δ of a new tread rubber having an improved balance of dry traction and low rolling resistance (i.e., greater dry traction at same or lower rolling resistance) is obtained by:

increased tan δ in the frequency range of the dry traction and/or;

decreased tan δ in the frequency range of tire rolling resistance measurements, which is tantamount to an increase in absolute slope of a linear function of tan δ vs. frequency (or temperature per WLF (Williams-Landel-Ferry) frequency temperature shifts) between the frequencies of interest.

Slope determinations from a linear function of tan δ in the easily measured range of 1 to 30 Hertz, are sufficient for practical compounds, to predict the slope between the frequencies of interest (@ dry traction and rolling resistance measurement on b 67' road wheels).

Utility of the above DTI as a predictor of tire dry traction has been verified by the correlation test as shown by the accompanying drawing of five tread compounds spanning dry μ values from 0.93 to 1.00 (normalized dry peak coefficient of friction).

EXAMPLE II

In a tire experiment wherein it was desired to improve dry traction a small amount while maintaining or reducing rolling resistance, light truck tires of size LT245/75R16) were built with two tread cap compounds containing the same ingredients and quantities except that one contained HMW polyethylene like that described above and extra process oil. The compound without HMW polyethylene, designated as "C" is made of natural rubber, carbon black, aromatic process oil, amine antioxidants, activator (stearic acid and zinc oxide) and curatives (sulfenamide accelerator and sulfur) in a conventional two pass mix in an internal mixer. A compound designated as "D" contained four parts (PHR) of HMW polyethylene and five parts additional aromatic process oil added to the finish pass (over and above the amount already employed in compound "C"). Table II, below, contains the dry-pavement traction and rolling resistance data.

TABLE II

|  | C | D |
|---|---|---|
| Relative 40 MPH dry traction, peak/slide avg. | 100 | 105 |
| 67 Inch Road-Wheel Rolling Resistance, Newtons | 44.9 | 43.7 |

NOTES FOR TABLE II:

40 MPH Dry Traction Test: Traction-trailer test on surface "S" at the Automotive Proving Grounds, Pecos, Texas.

Values reported are for the average of two tires; each tire tested for several runs, measuring both peak and slide values of traction; and averaging to yield the Peak/Slide composite. Test tires' values are normalized by use of any internal control tire to monitor traction changes due to uncontrollable variables.

Test tire load and inflation pressure=1250 lbs. and 50 psi.

Rolling Resistance Test: 67 inch Roadwheel Test; Surfaced with "3M Safety Walk" to simulate road pavement texture.

Steady-state; equilibrium value reported; after tire break-in and warm up.

Test room temperature=75° F.

Test tire load and inflation=1300 lbs. and 55 psi.

We claim:

1. A method of preparing a vulcanizable rubber compound useful in forming a tread cap for a pneumatic tire comprising
    a. mixing at a temperature of from about 290° to 350° F. rubber; carbon black; a process oil selected from the group consisting of aromatic, naphthenic and paraffinic oils and blends thereof; antioxidant; wax and activator to form a masterbatch, cooling the masterbatch and
    b. mixing with the masterbatch at a temperature of from about 200° to 240° F., from about 2 to 20 PHR of a crystalline and linear polyethylene having a weight average molecular weight of from about one to six million, a density (g/cc) of from about 0.93 to 0.95, a softening point above about 275° F. and a particle size where about 70% of the particles pass a U.S. Standard Scale No. 100 sieve and 99% pass a Scale No. 80 sieve, and curatives to form the vulcanizable rubber compound, and optionally an additional amount of said process oil,
    the total amount of said process oil used being from about 4 to 65 PHR and the temperature during mixing in b. being insufficient to significantly alter the size and shape of the polyethylene particles and also insufficient to bring about a state of polyethylene to rubber interaction causing rough extrusions with edge tearing
    and said rubber being one or more rubbers selected from the group consisting of natural rubber; polyisoprene; emulsion or solution SBR which may be low, medium or high vinyl; cis polybutadiene and vinyl polybutadiene.

2. A method according to claim 1 where said polyethylene is used in an amount of from about 5 to 15 PHR and has a weight average molecular weight of about 1.5 million, where said process oil is used in said compound in a total amount of from about 6 to 40 PHR and where the temperature of mixing in a. is about 320° F. and where the temperature of mixing in b. is about 220° F.

3. The product produced by the method of claim 1.

4. The product produced by the method of claim 2.

* * * * *